US006607827B2

United States Patent
Hanai

(10) Patent No.: US 6,607,827 B2
(45) Date of Patent: Aug. 19, 2003

(54) FLAME-RETARDANT PRESSURE-SENSITIVE ADHESIVE COMPOSITION AND FLAME-RETARDANT PRESSURE-SENSITIVE ADHESIVE TAPE

(75) Inventor: Hiroomi Hanai, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/987,993

(22) Filed: Nov. 16, 2001

(65) Prior Publication Data
US 2002/0102401 A1 Aug. 1, 2002

(30) Foreign Application Priority Data

Dec. 5, 2000 (JP) .................................. P. 2000-369659

(51) Int. Cl.$^7$ ................... B32B 15/04; B32B 7/12; C09J 7/02
(52) U.S. Cl. ................ 428/343; 428/355 AC; 428/921
(58) Field of Search ............... 428/343, 355 AC, 428/921

(56) References Cited

U.S. PATENT DOCUMENTS

| | | | | |
|---|---|---|---|---|
| 4,061,826 A | * | 12/1977 | Petras et al. | 428/356 |
| 4,699,824 A | * | 10/1987 | Pufahl | 428/220 |
| 5,591,522 A | * | 1/1997 | Sakai et al. | 428/353 |
| 6,022,914 A | * | 2/2000 | Nowak et al. | 524/101 |

OTHER PUBLICATIONS

Albemarle Corporation product brochure: SAYTEX 8010 Flame Retardant.*
News release, Apr. 1, 1998, from Albemarle Corp., searched under keywords 'SAYTEX 8010' at http://www.albemarle-.com/searchfrm.htm.*

* cited by examiner

Primary Examiner—Daniel Zirker
Assistant Examiner—Victor S Chang
(74) Attorney, Agent, or Firm—Sughrue Mion, PLLC

(57) ABSTRACT

A flame-retardant pressure-sensitive adhesive composition having both excellent tackiness and flame retardancy is described which comprises, as flame-retardants, (A) ethylenebispentabromobiphenyl, and (B) a brominated bisphenol and (C) antimony trioxide and, as a base polymer, (D) an acrylic polymer, said flame-retardant components (A), (B) and (C), in terms of weight ratio, satisfying the following equations:

$$2 \leq [(A)+(B)]/(C) \leq 6$$

and $$(B) \leq (A),$$

and said [(A)+(B)] being added in an amount of from 30 to 90 parts by weight and said (B) being added in an amount of 15 parts by weight or greater, each based on 100 parts by weight of the base polymer (D); and a flame-retardant pressure-sensitive adhesive tape using the composition and electronic parts or a transformer utilizing the tape are also described.

11 Claims, No Drawings

FLAME-RETARDANT PRESSURE-SENSITIVE ADHESIVE COMPOSITION AND FLAME-RETARDANT PRESSURE-SENSITIVE ADHESIVE TAPE

FIELD OF THE INVENTION

The present invention relates to a flame-retardant pressure-sensitive adhesive composition having excellent tackiness and flame retardancy, a flame-retardant pressure-sensitive adhesive tape using the composition and an electronic part or a transformer utilizing the tape.

BACKGROUND OF THE INVENTION

Electrical insulating pressure-sensitive adhesive tapes are usually employed for layer and outer insulation of a transformer. These electrical-insulating pressure-sensitive adhesive tapes are required to have not only adhesive strength and electrical insulating property but also high flame retardancy for ensuring safety. In recent years, they are requested to satisfy the UL 510 FR standards which are UL standards for an electrical insulating tape used for electronic parts.

In order to impart this electrical-insulating pressure-sensitive adhesive tape with flame retardancy, decabromodiphenyl oxide, a halogen-based flame-retardant, was conventionally employed. This flame-retardant was able to impart the tape with flame retardancy without lowering adhesive properties. Since regulations on the material has been severer in Europe owing to environmental problems, its use was limited and instead of it, tetrabromobisphenol A or a derivative thereof, tribromophenol or ethylenebispentabromobiphenyl has come to be used.

SUMMARY OF THE INVENTION

The single use of these flame retardants is however accompanied with the problems such as deterioration in adhesive properties and insufficient flame retardancy and there is accordingly a demand for their improvement.

With a view to overcoming the above-described problems, the present invention has been made. It has been found that an acrylic flame-retardant pressure-sensitive adhesive composition having both excellent adhesive properties and flame retardancy is available by adding, to (D) an acrylic polymer, (A) ethylenebispentabromobiphenyl, (B) a brominated bisphenol and (C) antimony trioxide as flame-retardants at a specific ratio, leading to the completion of the present invention.

In one aspect of the invention, there is thus provided a flame-retardant pressure-sensitive adhesive composition, which comprises, as flame-retardants, (A) ethylenebispentabromobiphenyl, (B) a brominated bisphenol and (C) antimony trioxide and, as a base polymer, (D) an acrylic polymer, said flame-retardant components (A), (B) and (C), in terms of weight ratio, satisfying the following conditions:

$$2 \leq [(A)+(B)]/(C) \leq 6$$

and $$(B) \leq (A),$$

and said [(A)+(B)] being added in an amount of from 30 to 90 parts by weight and said (B) being added in an amount of 15 parts by weight or greater, each based on 100 parts by weight of the base polymer (D).

In another aspect of the invention, there is also provided a flame-retardant pressure-sensitive adhesive tape which comprises a base material having provided at least on one side thereof the above-described flame-retardant pressure-sensitive adhesive composition and satisfies the flame retardancy of the UL-510 FR standards. In a further aspect of the present invention, there is also provided a flame-retardant pressure-sensitive adhesive tape having adhesive strength, as measured in accordance with the UL-510 FR standards, of 3.325 N/19 mm or greater, particularly a flame-retardant pressure-sensitive adhesive tape employed for electrical insulation of electronic parts or a transformer.

In a still further aspect of the invention, there is also provided electronic parts or a transformer having the above-described flame-retardant pressure-sensitive adhesive tape adhered thereto.

DETAILED DESCRIPTION OF THE INVENTION

The present invention is characterized in that to an acrylic polymer (D), ethylenebispentabromobiphenyl (A), a brominated bisphenol (B) and antimony trioxide (C) which are flame-retardants are added as essential components. The ethylenebispentabromobiphenyl (A) has high flame retardancy but tends to lower adhesive properties, while the brominated bisphenol (B) exhibits low flame retardancy but is highly effective for improving adhesive properties. This means that single use of ethylenebispentabromobiphenyl (A) imparts a tape with excellent flame retardancy but owing to low adhesive properties, flagging occurs at the end portion of the tape, while single use of the brominated bisphenol (B) enables exhibition of adhesive properties but lowers flame retardancy.

Antimony trioxide is known as an assistant flame retardant for improving flame retardancy of a brominated type flame retardant such as ethylenebispentabromobiphenyl (A). If it is not used in combination, a flame retardant must be used much, which is causative of lowering in adhesive properties. In the invention, adhesion and flame retardancy can be attained simultaneously by mixing the above-described three components at a specific ratio.

In the invention, ethylenebispentabromobisphenyl (A), a brominated bisphenol (B) and antimony trioxide (C) are added so as to satisfy, in terms of weight ratio, the following equations:

$$2 \leq [(A)+(B)]/(C) \leq 6,$$

preferably $$3 \leq [(A)+(B)]/(C) \leq 4,$$

and $$(B) \leq (A),$$

and to adjust the amount of the [(A)+(B)] to 30 to 90 parts by weight, particularly 50 to 70 parts by weight and the amount of (B) to 15 parts by weight or greater, preferably 20 parts by weight or greater, each based on 100 parts by weight of the base polymer (D).

The amount of antimony trioxide (C) less than the ⅙ of the amount [(A)+(B)] of ethylenebispentabromobiphenyl (A) and brominated bisphenol (B) lowers flame retarding effect, while its amount greater than the ½ adversely affects adhesive properties, becoming a cause for flagging from the end portion of adhesion.

When the amount of the brominated bisphenol (B) is greater than that of ethylenebispentabromobiphenyl (A), the pressure-sensitive adhesive layer transfers to the back side of a tape upon rewinding of a pressure-sensitive adhesive tape (particularly, rewinding under low temperatures), by which the tape becomes unusable.

In the invention, amount [(A)+(B)] of ethylenebispentabromobiphenyl (A) and the brominated bisphenol (B) exceeding 90 parts by weight based on 100 parts by weight of the base polymer (D) cause lowering in adhesive properties, becoming a cause for flagging at the end portion of adhesion. At an amount of [(A)+(B)] not greater than 30 parts by weight, on the other hand, flame-retarding performance cannot be exhibited. At this time, when the amount of the brominated bisphenol (B) is less than 15 parts by weight, adhesive properties are not satisfactory. The brominated bisphenol (B) must therefore be added in an amount of 15 parts by weight or greater.

Ethylenebispentabromobiphenyl (A) to be used in the invention is commercially available and "SAYTEX8010", product of Albemarle Corporation can be used for example. Examples of the brominated bisphenol include brominated bisphenol A and brominated bisphenol S having 1 to 8 bromine atoms bonded to the benzene ring of a bisphenol A residue and a bisphenol S residue, respectively. Specific examples include monobromobisphenol A, dibromobisphenol A tribromobisphenol A, tetrabromobisphenol A, pentabromobisphenol A, hexabromobisphenol A, octabromobisphenol A, tetrabromobisphenol A bis(2-hydroxyethyl ether), tetrabromobisphenol A bis (2-bromoethyl ether), tetrabromobisphenol A bis(1,2-dibromoethyl ether), tetrabromobisphenol A bis(propyl ether), tetrabromobisphenol A bis(3-bromopropyl ether), tetrabromobisphenol A bis(2,3-dibromopropyl ether), monobromobisphenol S, dibromobisphenol S, tribromobisphenol S, tetrabromobisphenol S, pentabromobisphenol S, hexabromobisphenol S, octabromobisphenol S, tetrabromobisphenol S bis(2-hydroxyethyl ether), tetrabromobisphenol S bis (2-bromoethyl ether), tetrabromobisphenol S bis(1,2-dibromoethyl ether), tetrabromobisphenol S bis (propyl ether), tetrabromobisphenol S bis (3-bromopropyl ether), tetrabromobisphenol S bis (2,3-dibromopropyl ether) and brominated bisphenol A type carbonate oligomer.

Examples of the commercially available brominated bisphenol include "FR-1524" of Bromokem Far East Ltd., "Saytex RB-100" of Albemarle Corporation, "Great Lakes BA-50", "Great Lakes BA-50P", "Great Lakes BA-59", "Great Lakes BA-59P" and "Great Lakes PE-68" of Great Lakes Chemical Corporation, "Fire Guard 2000", "Fire Guard 3000", "Fire Guard 3100", "Fire Guard 7500" and "Fire Guard 8500" of Teijin Chemicals Ltd. and "NONNEN PR-2" of Marubishi Oil Chemical Co., Ltd.

Examples of the acrylic polymer (D) to be used in the invention include copolymers of an acrylic acid or methacrylic acid ester monomer having an alkyl group such as methyl, ethyl, propyl, butyl, isobutyl, isoamyl, hexyl, 2-ethylhexyl, isooctyl, isononyl or isodecyl group and a functional-group-containing monomer such as acrylic acid or methacrylic acid. These monomers can be use either singly or in combination of two or more thereof.

The flame-retardant pressure-sensitive adhesive composition of the invention has improved flame retardancy by adding thereto a small amount of a hydrated metal compound such as magnesium hydroxide or aluminum hydroxide as needed. In order to improve the adhesive properties of the composition, various tackifiers such as a rosin resin can be added thereto within a range not impairing its flame retardancy. If necessary, a crosslinking agent such as polyisocyanate type can be added to the composition to improve its cohesive force or heat resistance.

The flame-retardant pressure-sensitive adhesive tape of the invention has, on at least one side of its base material, the above-described flame-retardant pressure-sensitive adhesive composition as a layer. Although no particular limitation is imposed on the base material to have thereon the pressure-sensitive adhesive layer, it is desired to have both heat resistance and insulating properties. Examples include plastic films such as polyester and polypropylene, paper, non-woven fabric, and single base materials or composite base materials of polyimide, polyamide and polyacetate having heat resistance. A base material impregnated with an epoxy resin can be used in some cases. Such a base material is preferred to have flame retardancey.

When the tape is used as an electrical insulating flame-retardant pressure-sensitive adhesive tape used particularly for insulation of electronic parts or a transformer, use of a polyester film is preferred in consideration of heat resistance and insulating properties, and also cost. The base material preferably has a thickness of about 25 to 50 µm.

The base material may be subjected to back-side treatment for controlling rewinding ease as needed. Alternatively, undercoating is given to improve the anchoring effect between the base material and pressure-sensitive adhesive.

The above-described pressure-sensitive adhesive layer can be disposed on at least one side of the base material, in other words, on one side or both sides of the base material as a single layer or plural layers by coating. The pressure-sensitive adhesive layer usually has a thickness of at least 15

μm, preferably 25 to 40 μm. At a thickness less than 15 μm, the layer does not always exhibit sufficient adhesion performance so that such a thickness is not preferred.

The flame-retardant pressure-sensitive adhesive tape of the invention is preferred to satisfy the flame retardancy as evaluated by UL-510 FR standards of UL standards (Underwriters Laboratories). It is desired to have adhesive strength of at least 3.325 N/19 mm, preferably about 4.0 to 10.0 N/19 mm as evaluated by the UL-510 FR standards.

No particular limitation is imposed on the using purpose of the flame-retardant pressure-sensitive adhesive tape of the invention insofar as it requires flame retardancy. In particular, it is preferably used for various electronic parts. The tape is adhered to electronic parts to constitute a part thereof. Although no particular limitation is imposed on such electronic parts, the tape is used for layer or outer insulation of a transformer.

As described above, the present invention makes it possible to provide a flame-retardant pressure-sensitive adhesive composition and a flame-retardant pressure-sensitive adhesive tape having flame retardancy enough for satisfying the UL-510 FR standards and also having excellent adhesive properties free of problems in practical use.

The present invention will hereinafter be described more specifically by examples. It should however be borne in mind that the present invention is not limited to or by them. All designations of "part" or "parts" mean part or parts by weight.

EXAMPLE 1

A flame-retardant pressure-sensitive adhesive tape of the invention was prepared by applying, onto one side of a polyester film (50 μm thick), a mixture which had been obtained by dispersing and mixing, in an acrylic polymer composed of 50 parts of butyl acrylate, 45 parts of ethyl acrylate and 5 parts of acrylic acid, 15 parts of "SAYTEX 8010" of Albemarle Corporation as ethylenebispentabromobiphenyl, 15 parts of "Fire Guard 3000" of Teijin Chemicals Ltd. as a brominated bisphenol, and 15 parts of antimony trioxide and adding to the resulting dispersion a toluene as a diluting solvent to adjust its viscosity by an applicator to give its dry thickness of 30 μm, followed by drying at drying temperature of 130° C. for 3 minutes.

EXAMPLE 2

In a similar manner to Example 1 except that 75 parts of "SAYTEX 8010", 15 parts of "Fire Guard 3000" and 15 parts of antimony trioxide were mixed, a flame-retardant pressure-sensitive adhesive tape was obtained.

EXAMPLE 3

In a similar manner to Example 1 except that 45 parts of "SAYTEX 8010", 25 parts of "Fire Guard 3000" and 20 parts of antimony trioxide were mixed, a flame-retardant pressure-sensitive adhesive tape was obtained.

EXAMPLE 4

In a similar manner to Example 1 except that 40 parts of "SAYTEX 8010", 30 parts of "Fire Guard 3000" and 20 parts of antimony trioxide were mixed, a flame-retardant pressure-sensitive adhesive tape was obtained.

EXAMPLE 5

In a similar manner to Example 1 except that 60 parts of "SAYTEX 8010", 30 parts of "Fire Guard 3000" and 20 parts of antimony trioxide were mixed, a flame-retardant pressure-sensitive adhesive tape was obtained.

EXAMPLE 6

In a similar manner to Example 1 except that 45 parts of "SAYTEX 8010", 45 parts of "Fire Guard 3000" and 20 parts of antimony trioxide were mixed, a flame-retardant pressure-sensitive adhesive tape was obtained.

EXAMPLE 7

In a similar manner to Example 1 except that 40 parts of "SAYTEX 8010", 20 parts of "Fire Guard 3000" and 20 parts of antimony trioxide were mixed, a flame-retardant pressure-sensitive adhesive tape was obtained.

EXAMPLE 8

In a similar manner to Example 1 except that 30 parts of "SAYTEX 8010", 15 parts of "Fire Guard 3000" and 10 parts of antimony trioxide were mixed, a flame-retardant pressure-sensitive adhesive tape was obtained.

Comparative Example 1

In a similar manner to Example 1 except that 30 parts of "SAYTEX 8010", 10 parts of "Fire Guard 3000" and 20 parts of antimony trioxide were mixed, a flame-retardant pressure-sensitive adhesive tape was obtained.

Comparative Example 2

In a similar manner to Example 1 except that 30 parts of "SAYTEX 8010", 35 parts of "Fire Guard 3000" and 20 parts of antimony trioxide were mixed, a flame-retardant pressure-sensitive adhesive tape was obtained.

Comparative Example 3

In a similar manner to Example 1 except that 60 parts of "SAYTEX 8010", 35 parts of "Fire Guard 3000" and 20 parts of antimony trioxide were mixed, a flame-retardant pressure-sensitive adhesive tape was obtained.

Comparative Example 4

In a similar manner to Example 1 except that 15 parts of "SAYTEX 8010", 25 parts of "Fire Guard 3000" and 20 parts of antimony trioxide were mixed, a flame-retardant pressure-sensitive adhesive tape was obtained.

Comparative Example 5

In a similar manner to Example 1 except that "SAYTEX 8010" was omitted and 40 parts of "Fire Guard 3000" and 20 parts of antimony trioxide were mixed, a flame-retardant pressure-sensitive adhesive tape was obtained.

Comparative Example 6

In a similar manner to Example 1 except that 40 parts of "SAYTEX 8010" and 20 parts of antimony trioxide were mixed but "Fire Guard 3000" was omitted, a flame-retardant pressure-sensitive adhesive tape was obtained.

Comparative Example 7

In a similar manner to Example 1 except that 40 parts of "SAYTEX 8010", 20 parts of "Fire Guard 3000" and 8 parts of antimony trioxide were mixed, a flame-retardant pressure-sensitive adhesive tape was obtained.

Comparative Example 8

In a similar manner to Example 1 except that 40 parts of "SAYTEX 8010", 20 parts of "Fire Guard 3000" and 35 parts of antimony trioxide were mixed, a flame-retardant pressure-sensitive adhesive tape was obtained.

Comparative Example 9

In a similar manner to Example 1 except that 30 parts of "SAYTEX 8010", 15 parts of "Fire Guard 3000" and 5 parts of antimony trioxide were mixed, a flame-retardant pressure-sensitive adhesive tape was obtained.

Comparative Example 10

In a similar manner to Example 1 except that 30 parts of "SAYTEX 8010", 15 parts of "Fire Guard 3000" and 25 parts of antimony trioxide were mixed, a flame-retardant pressure-sensitive adhesive tape was obtained.

The various properties of the flame-retardant pressure-sensitive adhesive tapes thus obtained were measured by the below-described methods and results are shown in Tables 1 and 2.

<Adhesive Strength>

Measured by the testing method for an electrical-insulating pressure-sensitive adhesive tape for masking (ASTM D 1000-88) of American Society for Testing Materials in accordance with the UL-510 FR standards.

<Flame Retardancy>

The combustion test of the tape was conducted in accordance with the UL-510 FR standards and it was judged either qualified or disqualified.

<Adhesive Residue>

Adhesive residue at the back side of a tape is judged when tape samples stacked and adhered on a SUS 304BA plate were heated in an oven of 50° C. for 24 hours and then the top of the stacked tape samples was peeled in an atmosphere of 0° C. The tape with no adhesive residue was judged OK.

TABLE 1

| | | Examples | | | | | | | |
|---|---|---|---|---|---|---|---|---|---|
| | | 1 | 2 | 3 | 4 | 5 | 6 | 7 | 8 |
| Main components (parts) | (D) Acrylic polymer | 100 | 100 | 100 | 100 | 100 | 100 | 100 | 100 |
| | (A) "SAYTEX 8010" | 15 | 75 | 45 | 40 | 60 | 45 | 40 | 30 |
| | (B) "Fire Guard 3000" | 15 | 15 | 25 | 30 | 30 | 45 | 20 | 15 |
| | (C) Antimony trioxide | 15 | 15 | 20 | 20 | 20 | 20 | 20 | 10 |
| Properties | Adhesive strength [N/19 mm] | 8.3 | 7.2 | 9.5 | 9.7 | 9.3 | 9.5 | 8.6 | 7.8 |
| | Flame retardancy | Qualified | Qualified | Qualified | Qualified | Qualified | Qualified | Qualified | Qualified |
| | Adhesive residue | OK | OK | OK | OK | OK | OK | OK | OK |

TABLE 2

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Main components (parts) | (D) Acrylic polymer | 100 | 100 | 100 | 100 | 100 | 100 | 100 | 100 | 100 | 100 |
| | (A) "SAYTEX 8010" | 30 | 30 | 60 | 15 | 0 | 40 | 40 | 40 | 30 | 30 |
| | (B) "Fire Guard 3000" | 10 | 35 | 35 | 25 | 40 | 0 | 20 | 20 | 15 | 15 |
| | (C) Antimony trioxide | 20 | 20 | 20 | 20 | 20 | 20 | 8 | 35 | 5 | 25 |
| Properties | Adhesive strength [N/19 mm] | 2.3 | 8.4 | 3.2 | 7.2 | 8.5 | 2.2 | 9.2 | 3.0 | 8.8 | 2.9 |
| | Flame retardancy | Qualified | Qualified | Qualified | Disqualified | Disqualified | Qualified | Disqualified | Qualified | Disqualified | Qualified |
| | Adhesive residue | OK | NG | OK | OK | OK | OK | OK | OK | OK | OK |

While the invention has been described in detail and with reference to specific embodiments thereof, it will be apparent to one skilled in the art that various changes and modifications can be made therein without departing from the spirit and scope thereof.

What is claimed is:

1. A flame-retardant pressure-sensitive adhesive composition which comprises, as flame-retardants, (A) ethylenebispentabromobiphenyl, (B) a brominated bisphenol and (C) antimony trioxide and, as a base polymer, (D) an acrylic polymer, said flame-retardant components (A), (B) and (C), in terms of a weight ratio, satisfying the following conditions:

$$2 \leq [(A)+(B)]/(C) \leq 6$$

and $$(B) \leq (A),$$

and said [(A)+(B)] being added in an amount of from 30 to 90 parts by weight and said (B) being added in an amount of 15 parts by weight or greater, each based on 100 parts by weight of the base polymer (D).

2. A flame-retardant pressure-sensitive adhesive tape which comprises a base material having provided at least on one side thereof a flame-retardant pressure-sensitive adhesive composition as claimed in claim 1 and satisfies the flame retardancy of the UL-510 FR standards.

3. The flame-retardant pressure-sensitive adhesive tape as claimed in claim 2, which has adhesive strength, as measured in accordance with the UL-510 FR standards, of 3.325 N/19 mm or greater.

4. In an electronic part which includes a pressure-sensitive adhesive tape, the improvement comprising:

said pressure-sensitive adhesive tape is the flame-retardant pressure-sensitive adhesive tape as claimed in claim 2.

5. In an electronic part which includes a pressure-sensitive adhesive tape, the improvement comprising:

said pressure-sensitive adhesive tape is the flame-retardant pressure-sensitive adhesive tape as claimed in claim 3.

6. In a transformer which includes a pressure-sensitive adhesive tape, the improvement comprising:

said pressure-sensitive adhesive tape is the flame-retardant pressure-sensitive adhesive tape as claimed in claim 2.

7. In a transformer which includes a pressure-sensitive adhesive tape, the improvement comprising:

said pressure-sensitive adhesive tape is the flame-retardant pressure-sensitive adhesive tape as claimed in claim 3.

8. A method of providing electrical insulation to an electronic part, comprising applying the flame-retardant pressure-sensitive adhesive tape as claimed in claim 2 to said part, thereby providing said insulation.

9. A method of providing electrical insulation to an electronic part, comprising applying the flame-retardant pressure-sensitive adhesive tape as claimed in claim 3 to said part, thereby providing said insulation.

10. A method of providing electrical insulation to a transformer, comprising applying the flame-retardant pressure-sensitive adhesive tape as claimed in claim 2 to said transformer, thereby providing said insulation.

11. A method of providing electrical insulation to a transformer, comprising applying the flame-retardant pressure-sensitive adhesive tape as claimed in claim 3 to said transformer, thereby providing said insulation.

* * * * *